United States Patent
Nakano et al.

(10) Patent No.: US 8,459,932 B2
(45) Date of Patent: Jun. 11, 2013

(54) BEARING DEVICE OF GAS TURBINE POWER GENERATION EQUIPMENT AND GAS TURBINE POWER GENERATION EQUIPMENT

(75) Inventors: Susumu Nakano, Hitachi (JP); Tomoaki Inoue, Mito (JP); Tadaharu Kishibe, Hitachinaka (JP); Hiroyuki Shiraiwa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 901 days.

(21) Appl. No.: 11/995,945

(22) PCT Filed: Aug. 18, 2006

(86) PCT No.: PCT/JP2006/316246
§ 371 (c)(1),
(2), (4) Date: Jul. 6, 2009

(87) PCT Pub. No.: WO2008/020483
PCT Pub. Date: Feb. 21, 2008

(65) Prior Publication Data
US 2010/0111681 A1    May 6, 2010

(51) Int. Cl.
*F01D 25/16* (2006.01)
(52) U.S. Cl.
USPC ........................................ 415/112; 415/229
(58) Field of Classification Search
USPC .... 415/119, 110, 111, 112, 229, 180; 384/99, 384/535, 581
See application file for complete search history.

(56) References Cited

U.S. PATENT DOCUMENTS

| 3,934,947 | A | * | 1/1976 | Walter et al. | 384/111 |
|---|---|---|---|---|---|
| 4,440,456 | A | * | 4/1984 | Klusman | 384/582 |
| 4,669,893 | A | * | 6/1987 | Chalaire et al. | 384/99 |
| 5,215,384 | A | * | 6/1993 | Maier | 384/99 |
| 5,797,684 | A | * | 8/1998 | Becker | 384/99 |
| 7,066,651 | B2 | * | 6/2006 | Nicholas et al. | 384/99 |
| 7,628,542 | B2 | * | 12/2009 | Wada et al. | 384/535 |
| 7,730,713 | B2 | * | 6/2010 | Nakano et al. | 60/39.83 |
| 2005/0039433 | A1 | * | 2/2005 | Nakano et al. | 60/39.08 |
| 2007/0086685 | A1 | * | 4/2007 | Klusman et al. | 384/99 |
| 2010/0111681 | A1 | * | 5/2010 | Nakano et al. | 415/180 |

FOREIGN PATENT DOCUMENTS

| JP | 54159543 | A | * | 12/1979 |
|---|---|---|---|---|
| JP | 60-34996 | | | 3/1995 |
| JP | 2004-183614 | | | 7/2004 |
| JP | 2004-336917 | | | 11/2004 |
| JP | 2005-54779 | | | 3/2005 |
| JP | 2005-321035 | | | 11/2005 |

* cited by examiner

*Primary Examiner* — Edward Look
*Assistant Examiner* — Christopher R Legendre
(74) *Attorney, Agent, or Firm* — Mattingly & Malur, P.C.

(57) ABSTRACT

A bearing device of a gas turbine power generation equipment provides damping vibration of a shaft and lubricates and cools the bearing main body. The bearing devices have sleeves provided on the outer circumference sides of the bearing main bodies and bearing housings holding the respective sleeves via O-rings while each forming an annular clearance passage between each of the outer circumferences of the sleeves and a corresponding one of the bearing housings. The bearing housing has a feed-water hole communicating with the clearance passage and adapted to feed water thereto. The sleeve has a lead water hole communicating with the clearance passage and is adapted to lead water to the bearing main body, and a discharge hole which communicates with the clearance passage and is adapted to discharge water therefrom.

8 Claims, 5 Drawing Sheets

BEARING DEVICE OF GAS TURBINE POWER GENERATION EQUIPMENT AND GAS TURBINE POWER GENERATION EQUIPMENT

TECHNICAL FIELD

The present invention relates to a bearing device of gas turbine power generation equipment and gas turbine power generation equipment suitable as privately-owned electrical power generation facilities installed in stores, hospitals or the like.

BACKGROUND ART

Gas turbine power generation equipment used as e.g. privately-owned electric power generation facilities includes a compressor which compresses air; a combustor which mixes the air compressed by the compressor with fuel for combustion; a turbine which is rotationally driven by combustion gas from the combustor; and a generator which converts the rotational power of the turbine into electric energy. For example, the impeller of the compressor, the impeller of the turbine, and the rotor of the generator are connected to the same rotating shaft. For example, an oil-lubricated type bearing may be adopted as a bearing that rotatably carries the rotating shaft. In such a case, since the bearings cannot be provided at a high-temperature portion (e.g., the compressor and the turbine) where lubricating oil evaporates, they are disposed on both axial sides of the rotor of the generator. Thus, the rotating shaft will rotate at high speeds in an overhang state where the impeller of the compressor and the impeller of the turbine are disposed externally of the bearings. The inherent vibration characteristic of the rotating shaft has to pass through the characteristic frequency of bending vibration mode. The viscosity of lubricating oil increases a power loss of the bearing and further increases the power of a pump which feeds lubricating oil. This increases power consumption for auxiliaries, lowering power generation efficiency.

To deal with this, the following structure is disclosed for example (see e.g. patent document 1). O-rings are fitted into respective O-ring grooves formed in a stationary portion opposed to the outer circumferential portions of a bearing to elastically support the bearing, and an annular clearance is formed between the O-ring grooves. Lubricating oil is filled in the annular clearance to function as a squeeze film. Thus, the damping function of the squeeze film and the spring function of the O-rings damp the vibration of a shaft. In addition, this conventional art adopts a water-lubricated type bearing to reduce the power loss thereof, thereby improving power generation efficiency.

Patent Document 1: JP-A-2004-336917 (see FIG. 5)

DISCLOSURE OF THE INVENTION

Problem to be Solved by the Invention

However, the conventional art described above has the following room for improvement.

Although not clearly described, the water-lubricated type bearing mentioned above is presumed to have lubricating water filled therein. It is possible, therefore, that the lubricating water in the bearing absorbs heat from the circumference to rise to high temperatures, which lowers viscosity, leading to instability.

The present invention has been made in view of the forgoing and it is an object of the present invention to provide a bearing device of gas turbine power generation equipment that can provide a damping effect of shaft vibration and lubricate and cool a bearing main body, and gas turbine power generation equipment.

Means for Solving the Problem (1) To achieve the object described above, a bearing device of gas turbine power generation equipment according to the present invention includes: a water-lubricated type bearing main body rotatably carrying a rotor of a generator; a sleeve provided on the outer circumference side of the bearing main body; and a bearing housing holding the sleeve via an O-ring while forming an annular clearance between the outer circumference of the sleeve and the bearing housing; wherein the bearing housing has a feed-water hole communicating with the clearance passage and adapted to feed water thereto, and the sleeve has a lead water hole communicating with the clearance passage and adapted to lead water to the bearing main body, and a discharge hole which communicates with the clearance passage at a position axially apart by a predetermined distance from a communicating position of the feed-water hole with the clearance passage and is adapted to discharge water therefrom.

In the present invention, the annular clearance passage is formed between the outer circumferential surface of the sleeve and the bearing housing and water is fed to the clearance passage from the feed-water hole of the bearing housing. The water fed to the clearance passage is partially led to the water-lubricated type bearing main body through the lead water hole of the sleeve. Thus, the bearing main body can be lubricated and cooled. On the other hand, the remainder of the water fed to the clearance passage is discharged through the discharge hole of the sleeve. In this case, the discharge hole of the sleeve communicates with the clearance passage at a position axially apart by a predetermined distance (e.g. the approximately axial size of the bearing main body) from the communication position of the feed-water hole with the clearance passage. Thus, the water flows in the clearance passage to function as a squeeze film. The damping function of this film (the squeeze film effect) and the spring function of the O-ring can damp the vibration of the shaft. In particular, the water flows in the clearance passage to thereby prevent a lowering of viscosity due to rising temperature and a lowering of the squeeze film effect due to mixed bubbles.

(2) In item (1) mentioned above, preferably, a minimum value of a passage sectional area of a water discharge line adapted to discharge water from the clearance passage through the discharge hole of the sleeve is made smaller than a minimum value of a passage sectional area of a lead water line adapted to lead water from the clearance passage through the lead water hole of the sleeve to the bearing main body.

(3) In item (2) mentioned above, preferably, the minimum value of the passage sectional area of the discharge line is made equal to or smaller than 30% of the minimum value of the passage sectional area of the lead water line.

(4) In item (1) mentioned above, preferably, the feed-water hole of the bearing housing communicates with the clearance passage at a downside position of the clearance passage and the discharge hole of the sleeve communicates with the clearance passage at an upside position of the clearance passage.

(5) In item (1) mentioned above, preferably, the feed-water hole of the bearing housing is located axially inward of the generator and the discharge hole of the sleeve is located axially outward of the generator.

(6) To achieve the object described above, gas turbine power generation equipment according to the present invention includes: an impeller of a turbine which converts gas-thermal energy into mechanical energy; a generator which has a rotor coaxially connected to the impeller of the turbine and converts the mechanical energy into electrical energy; and a bearing device including: a water-lubricated type bearing main body rotatably carrying the rotor of the generator; a sleeve provided on the outer circumference side of the bearing main body; and a bearing housing holding the sleeve via an O-ring while forming an annular clearance between the outer circumference of the sleeve and the bearing housing; wherein the bearing housing has a feed-water hole communicating with the clearance passage and adapted to feed water, and the sleeve has a lead water hole communicating with the clearance passage and adapted to lead water to the bearing main body, and a discharge hole which communicates with the clearance passage at a position axially apart by a predetermined distance from a communicating position of the feed-water hole with the clearance passage and is adapted to discharge water therefrom.

(7) In item (6) mentioned above, preferably, a minimum value of a passage sectional area of a discharge-water line adapted to discharge water from the clearance passage through the discharge hole of the sleeve is made smaller than a minimum value of a passage sectional area of a lead water line adapted to lead water from the clearance passage through the lead water hole of the sleeve to the bearing main body.

(8) In item (7) mentioned above, preferably, the minimum value of the passage sectional area of the water discharge line is made equal to or smaller than 30% of the minimum value of the passage sectional area of the lead water line.

(9) In item (6) mentioned above, preferably, the feed-water hole of the bearing housing communicates with the clearance passage at a downside position of the clearance passage and the discharge hole of the sleeve communicates with the clearance passage at an upside position of the clearance passage.

(10) In item (6), preferably, the feed-water hole of the bearing housing is located axially inward of the generator and the discharge hole of the sleeve is located axially outward of the generator.

Effect of the Invention

According to the present invention, an effect of damping the vibration of a shaft can be provided and the bearing main body can be lubricated and cooled.

EXPLANATION OF REFERENCE NUMERALS

5 Generator
8 Rotor
10 Bearing main body
11 Bearing main body
12 Bearing device
13 Bearing device
23 Sleeve
24 Clearance passage
25 O-ring
26 Bearing housing
27 Feed-water hole
28 Lead water groove
29 Lead water hole
30 Lead water groove
31 Discharge hole

BEST MODE FOR CARRYING OUT THE INVENTION

One embodiment of the present invention will hereinafter be described with reference to the drawings.

Figure 1:
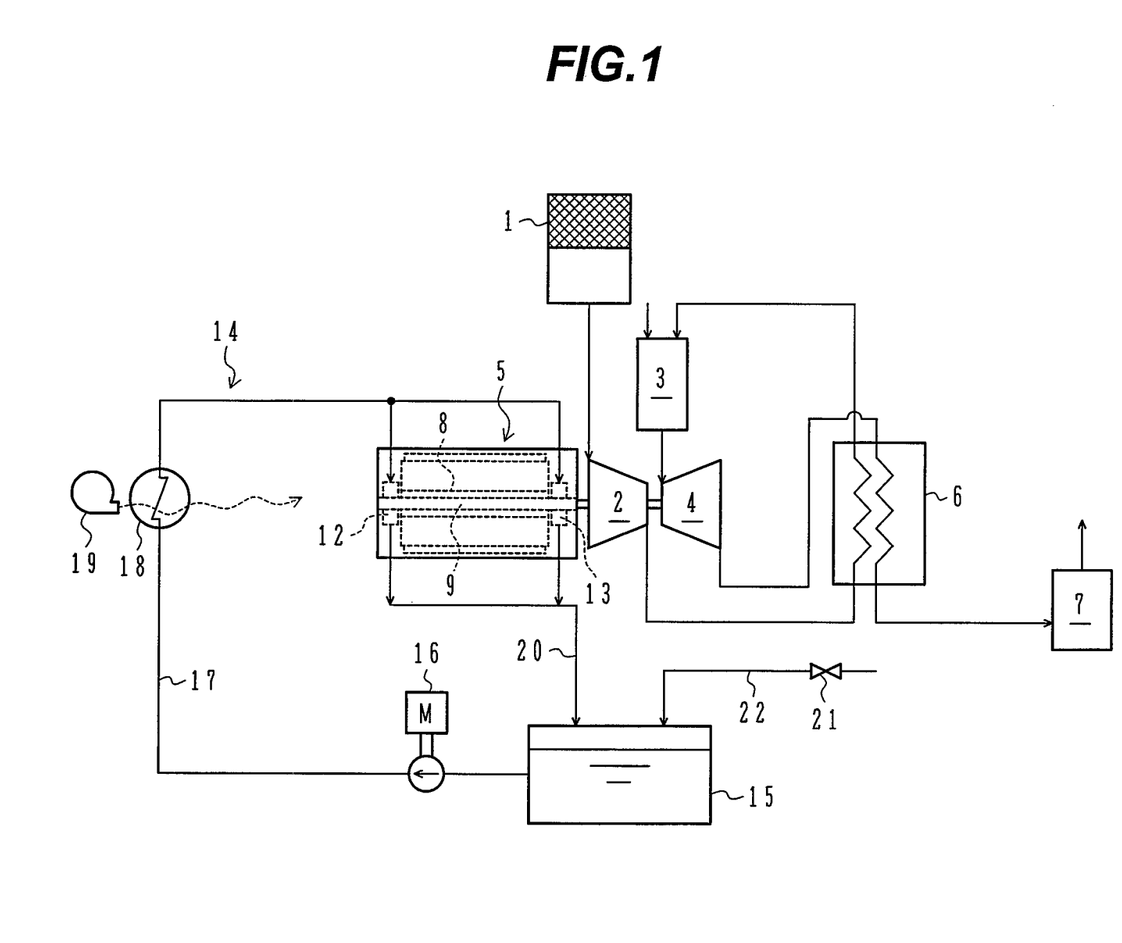
FIG. 1 is a schematic diagram illustrating the entire configuration of an embodiment of gas turbine power generation equipment according to the present invention along with a water circulation system.

FIG. 1 is a schematic diagram illustrating the entire configuration of an embodiment of gas turbine power generation equipment according to the present invention along with a water circulation system.

Referring to FIG. 1, gas turbine power generation equipment is used as e.g. privately-owned power generation equipment with a capacity of about 100 to 250 kW. This gas turbine power generation equipment includes a compressor 2 which compresses air (the atmosphere) sucked through an air intake filter 1; a combustor 3 which mixes the compressed air created by the compressor 2 with fuel for combustion; a turbine 4 which is rotationally driven by combustion gas from the combustor 3; a generator 5 which converts part of the rotational power of the turbine 4 into electric energy; a regenerating heat exchanger 6 which heats the compressed air fed from the compressor 2 to the combustor 3, using the exhaust gas of the turbine 5; and an exhaust silencer 7 which is provided on a line adapted to discharge exhaust gas used in the regenerating heat exchanger 6 to the atmosphere.

An impeller (not shown) of the compressor 2, an impeller (not shown) of the turbine 4 and a rotor 8 of the generator 5 are connected to one another via a rotating shaft 9. Bearing devices 12 and 13 are provided which include respective bearing main bodies 10 and 11 (see FIGS. 2 to 4 described later) rotatably carrying the rotating shaft 9. The bearing main bodies 10, 11 are disposed on both axial outsides of the rotor 8 of the generator 5. In other words, the rotating shaft 9 is designed to be rotated at high-speeds in an overhang state where the impeller of the compressor 2 and the impeller of the turbine 4 are disposed externally of the bearing main bodies 10, 11. Incidentally, in the present embodiment, the bearing main body 10 is subjected to the axial load of the rotating shaft 9 and the bearing main body 11 is subjected to the radial load of the rotating shaft 9 and to the axial load thereof.

A water circulation system 14 is provided which feeds water to the bearing devices 12, 13. This system 14 includes a water storage tank 15; a feed-water pipe 17 adapted to feed water to the bearing devices 12, 13 from the water storage tank 15 by driving a pump 16; a radiator 18 disposed, downstream of the pump 16, on the feed-water pipe 17; a blower 19 which supplies cooling air to the radiator 18; and a water discharge pipe 20 which leads the water from the bearing devices 12, 13 to the water storage tank 15. Incidentally, the storage tank 15 is refilled with water from an external feed-water source (not shown) via a replenishing pipe 22 provided with a stop valve 21.

Figure 2:
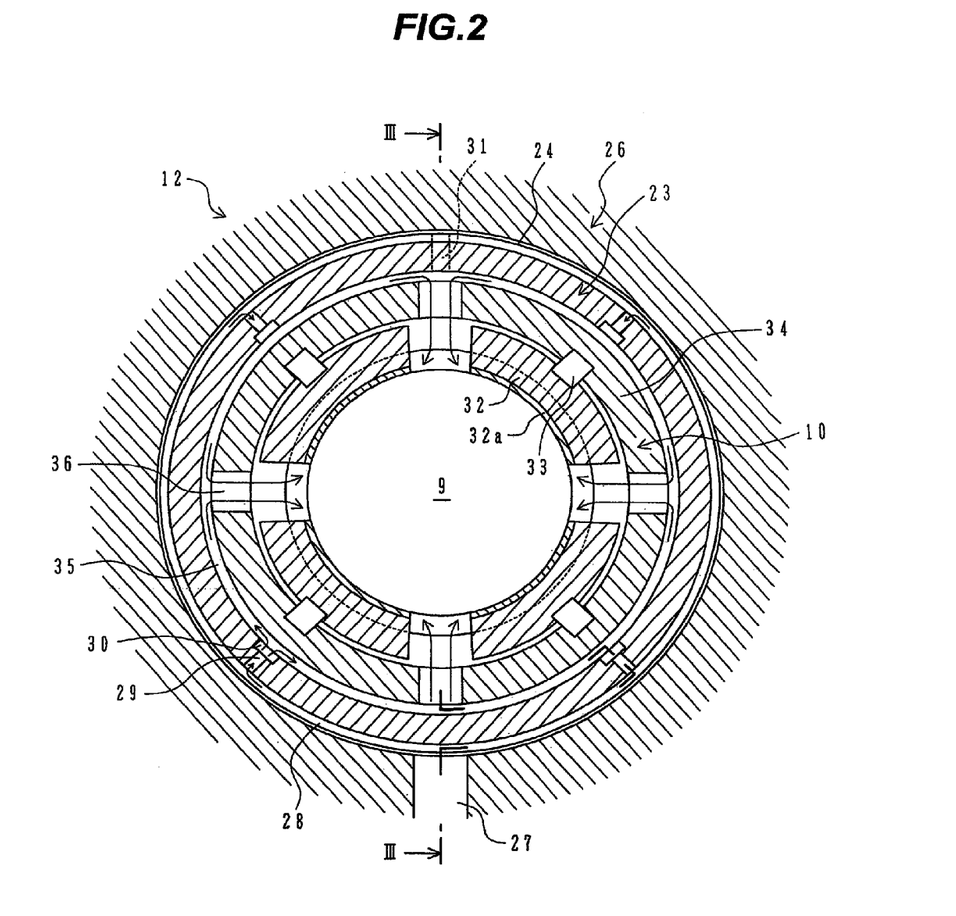
FIG. 2 illustrates a detailed structure of one of bearing devices constituting the embodiment of the gas turbine power generation equipment according to the present invention.
Figure 3:
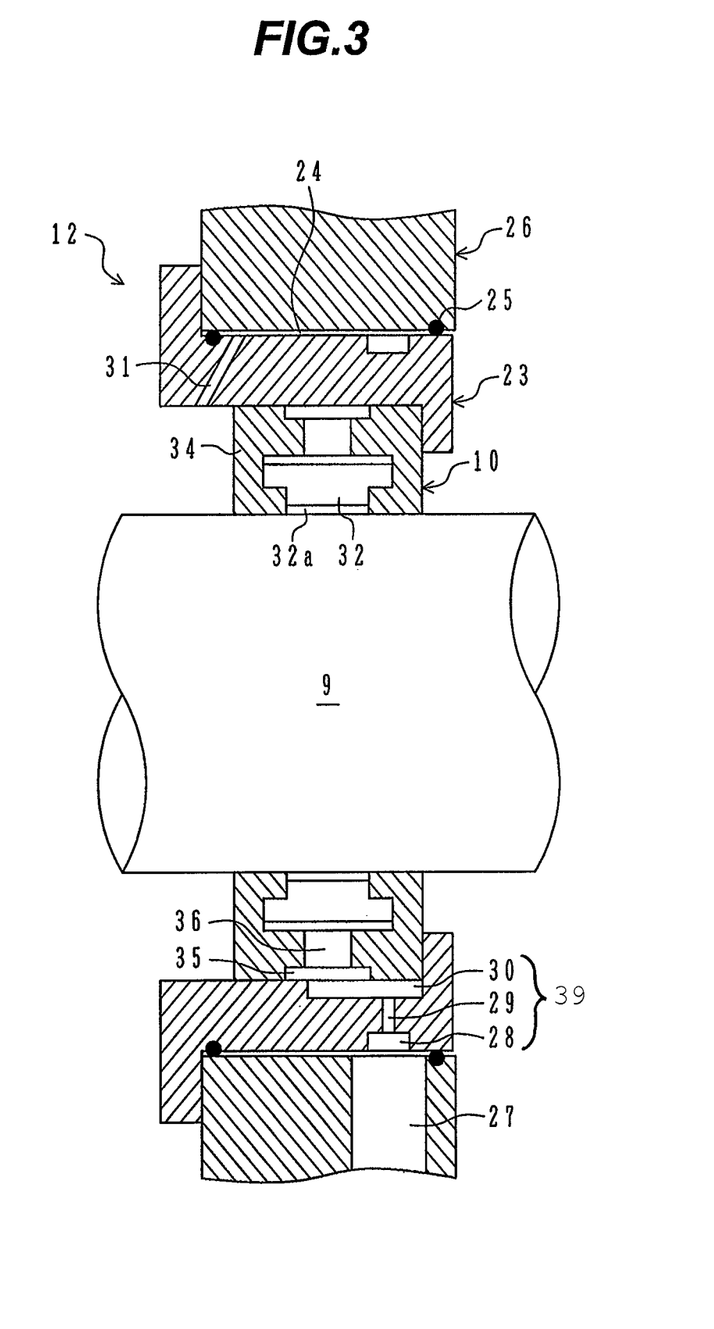
FIG. 3 is a cross-sectional view taken along line III-III in FIG. 2.

FIG. 2 is a radial cross-sectional view illustrating a detailed structure of the bearing device 12 and FIG. 3 is an axial cross-sectional view of the bearing device 12 taken along section III-III in FIG. 2.

Referring to FIGS. 2 and 3, the bearing device 12 includes the bearing main body 10 subjected to the radial load of the rotating shaft 9; a sleeve 23 provided on the outer circumferential side of the bearing main body 10; and a bearing housing 26 which carries the sleeve 23 via O-rings 25 while being adapted to form an annular clearance passage 24 between the outer circumferential surface of the sleeve 23 and the bearing housing 26.

A feed-water hole 27 is formed in the bearing housing 26. The feed-water hole 27 is connected to the feed-water pipe 17 and adapted to feed water to the clearance passage 24. The feed-water hole 27 is formed at a position axially inside of the generator 5 (i.e., close to the rotor 8 of the generator 5, on the right side in FIG. 3) and on the downside thereof (on the lower side in FIG. 3) with respect to the clearance passage 24.

A circumferential lead water groove 28 (a lead water hole) is formed on the outer circumferential surface of the sleeve 23 at an axial position corresponding to a communication position of the feed-water hole 27 of the bearing housing 26 with the clearance passage 24. In addition, the sleeve 23 includes four radial lead water holes 29 opening in the lead water groove 28 and four axial lead water grooves 30 (lead water holes) which are formed on the inner circumferential surface of the sleeve 23 and each of which communicates with a corresponding one of the lead water holes 29. A discharge hole 31 is formed in the sleeve 23 so as to communicate with the clearance passage 24 at a position axially apart by a predetermined distance (an approximately axial size of the bearing main body 10 in the embodiment) from the communication position of the feed-water hole 27 of the bearing housing 26 with the clearance passage 24 (in other wards, the communication position of the lead water groove 28). The discharge hole 31 is then connected to the water discharge pipe 20 for discharging water. In addition, the discharge hole 31 is formed at a position, in the clearance passage 24, axially external of the generator 8 (in other words, on a side opposed to the rotor 8 of the generator 5, on the left side in FIG. 3) and on the upside (on the upper side in FIG. 3).

The bearing main body 10 is e.g. a tilting pad bearing, and includes four journal pads 32 whose contact surfaces with the outer circumferential surface of the rotating shaft 9 are each formed of a PEEK resin 32a; four pivots 33 (illustrated in FIG. 2 only) tiltably carrying the respective journal pads 32; and a bearing case 34 receiving the journal pads 32 and pivots 33 therein. A circumferential lead water groove 35 is formed on the outer circumferential surface of the bearing case 34 so as to communicate with the lead water grooves 30 of the sleeve 23. Four radial lead water holes 36 are formed to allow the lead water groove 35 to communicate with the journal pads 32.

With the configuration of the bearing device 12 described above, water fed to the clearance passage 24 from the feed-water hole 27 of the bearing housing 26 is partially led to between the journal pads 32 through the lead water groove 28, lead water holes 29 and lead water grooves 30 of the sleeve 23 and through the lead water groove 35 and lead water holes 36 of the bearing main body 10, thereby lubricating the journal pads 32. In this way, the bearing main body 10 can be lubricated and cooled. On the other hand, the remainder of the water fed to the clearance passage 24 is discharged through the discharge hole 31 of the sleeve 23. In this case, the discharge hole 31 of the sleeve 23 communicates with the clearance passage 24 at a position axially apart by a predetermined distance from the communication position of the feed-water hole 27 with the clearance passage 24. Therefore, water flows in the clearance passage 24 to thereby function as a squeeze film. The damping function (the squeeze film effect) of this squeeze film and the spring function of the O-rings 25 can damp the vibration of the shaft. In particular, water flows in the clearance passage 24 to thereby prevent a lowering of viscosity due to rising temperature and a lowering of a squeeze film effect due to the mixing of bubbles.

In the present embodiment, the sectional area of the discharge hole 31 of the sleeve 23 is smaller than that of the clearance passage 24. Specifically, the sectional area of the discharge hole 31 of the sleeve 23 is a minimum value of the passage sectional area of the discharge line adapted to discharge water from the clearance passage 24 through the discharge hole 31 of the sleeve 23. The sectional area of the discharge hole 31 of the sleeve 23 is smaller than a minimum value (the total sectional area of the four lead water holes 29 in the present embodiment) of the passage sectional area of the lead water line 39 adapted to lead water from the clearance passage 24 through the lead water holes 29 and the like of the sleeve 23 to the bearing main body 10. For example, the sectional area of the discharge hole 31 of the sleeve 23 is set at 25% of the total sectional area of the four lead holes 29. The function and effect of this configuration is described with reference to FIG. 4.

Figure 4:
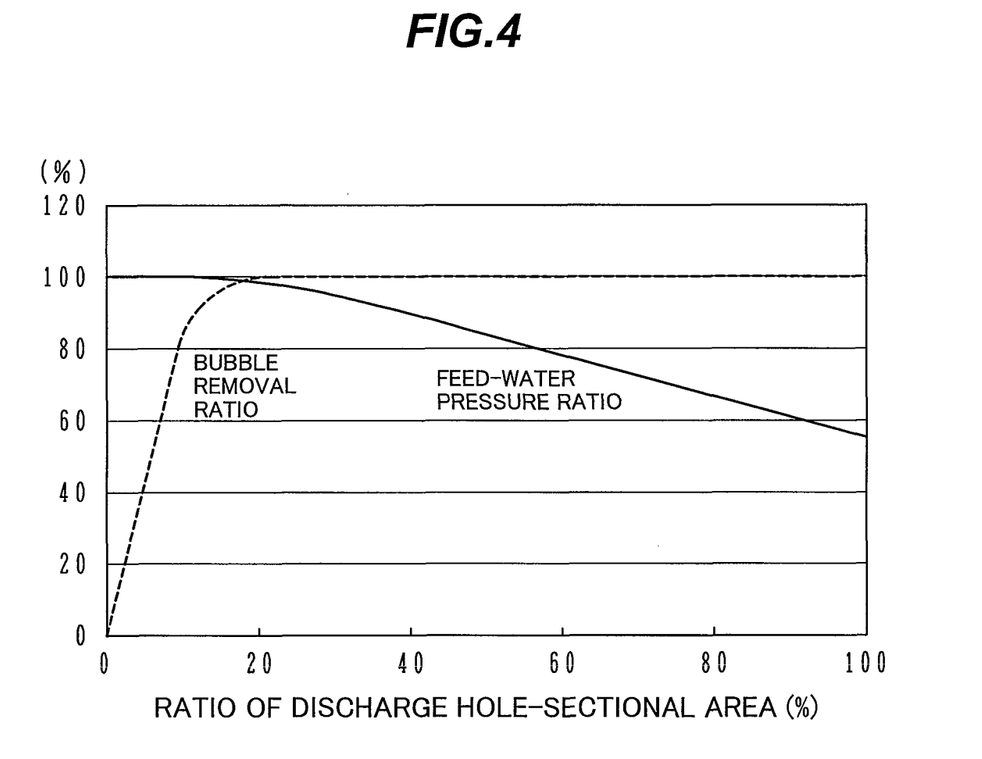
FIG. 4 is a characteristic diagram showing a change in the feed-water pressure of a clearance passage and a change in the removal ratio of bubbles with respect to a ratio of the sectional area of a discharge hole formed in a sleeve constituting the embodiment of the gas turbine power generation equipment according to the present invention.

FIG. 4 is a characteristic diagram showing a change in the feed-water pressure of the clearance passage 24 and a change in the removal ratio of bubbles mixed in the clearance passage 24 with respect to a ratio (%) of the sectional area of the discharge hole 31 to the total sectional area of the lead water holes 29.

As shown in FIG. 4, if the ratio of the sectional area of the discharge hole 31 included in the sleeve 23 is equal to 20% or more, the feed-water pressure lowers although the bubbles in the clearance passage 24 are virtually removed. The lowering of the feed-water pressure of the clearance passage 24 is unpreferable because it causes the lowering of the amount of water led to the bearing main body 10 as well as the lowering of the squeeze film effect mentioned above. On the other hand, also the bubbles mixed in the clearance passage 24 causes the lowering of the squeeze film effect. As just described, ensuring of the feed-water pressure of the clearance passage 24 and removal of bubbles are opposite requests. However, preferably, an area that satisfies both the requests exists in a range where the ratio of the sectional area of the discharge hole 31 is from about 10% to 30%. If the ratio of the sectional area of the discharge hole 31 is not zero, the bubbles in the clearance passage 24 will be discharged along with the flow of water. Taking this into account, it can be considered that the ensuring of feed-water pressure is more important. Thus, it can be said that the ratio of the sectional area of the discharge hole 31 is preferably greater than zero and not greater than 30%.

Figure 5:
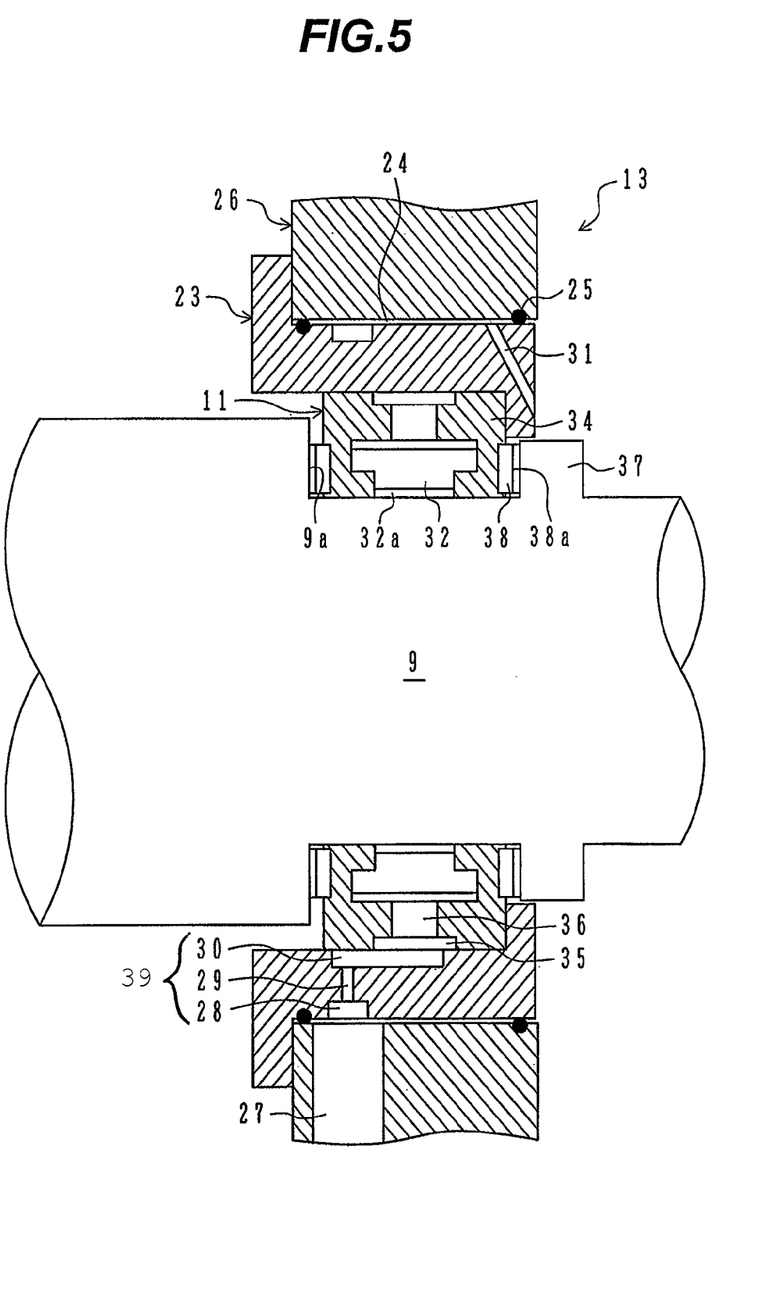
FIG. 5 illustrates a detailed structure of the other bearing device constituting the embodiment of the gas turbine power generation equipment according to the present invention.

FIG. 5 is an axial cross-sectional diagram illustrating a detailed structure of the bearing device 13, corresponding to that of FIG. 3 described above. Incidentally, in FIG. 5, the same portions as those of the bearing device 12 described above are denoted with like reference numerals.

Referring to FIG. 5, the bearing device 13 includes the bearing main body 11 subjected to the radial load of the rotating shaft 9 and to the axial load thereof; a sleeve 23 provided on the outer circumferential side of the bearing main body 11; and a bearing housing 26 which carries the sleeve 23 via O-rings 25 while being adapted to form an annular clearance passage 24 between the outer circumferential surface of the sleeve 23 and the bearing housing 26.

A feed-water hole 27 is formed in the bearing housing 26. The feed-water hole 27 is connected to the feed-water pipe 17 and adapted to feed water to the clearance passage 24. The feed-water hole 27 is formed at a position axially inside of the generator 5 (i.e., close to the rotor 8 of the generator 5, on the left side in FIG. 5) in the clearance passage 24 and on the downside (on the lower side in FIG. 5).

A circumferential lead water groove 28 (a lead water hole) is formed on the outer circumferential surface of the sleeve 23 at an axial position corresponding to a communication position of the feed-water hole 27 of the bearing housing 26 with the clearance passage 24. In addition, the sleeve 23 includes four radial lead water holes 29 opening in the lead water groove 28 and four axial lead water grooves 30 (lead water holes) which are formed on the inner circumferential surface of the sleeve 23 and each of which communicates with a corresponding one of the lead water holes 29. A discharge hole 31 is formed in the sleeve 23 so as to communicate with the clearance passage 24 at a position axially apart by a predetermined distance (in the embodiment, an approximately axial size of the bearing main body 11) from the communication position of the feed-water hole 27 of the bearing housing 26 with the clearance passage 24 (in other wards, the communication position of the lead water groove 28). The discharge hole 31 is then connected to the water discharge pipe 20 for discharging water. In addition, the discharge hole 31 is formed at a position axially external of the generator 5 (in other words, on a side opposed to the rotor 8 of the generator 5, on the left side in FIG. 5) in the clearance passage 24 and on the upside (on the upper side in FIG. 5).

The bearing main body 11 is e.g. a tilting pad bearing, and includes four journal pads 32 whose contact surfaces with the outer circumferential surface of the rotating shaft 9 are each formed of a PEEK resin 32a; four pivots (not shown) tiltably carrying the respective journal pads 32; and a bearing case 34 receiving the journal pads 32 and pivots therein; a plurality of thrust pads 38 which are provided on one axial side (on the left side in FIG. 5) of the bearing case 34 and on the other axial side thereof (on the right side in FIG. 5) and whose contact surfaces with a stepped portion 9a of the rotating shaft 9 and with a thrust collar 37 are each formed of a PEEK resin 38a; and a plurality of pivots (not shown) tiltably carrying the thrust pads 38. A circumferential lead water groove 35 is formed on the outer circumferential surface of the bearing case 34 so as to communicate with the lead water grooves 30 of the sleeve 23. Four radial lead water holes 36 are formed to allow the lead water groove 35 to communicate with the journal pads 32.

With the configuration of the bearing device 13 described above, like the bearing device 12 described above, water fed to the clearance passage 24 from the feed-water hole 27 of the bearing housing 26 is partially led to between the journal pads 32 through the lead water groove 28, lead water holes 29 and lead water grooves 30 of the sleeve 23 and through the lead water groove 35 and lead water holes 36 of the bearing main body 11, thereby lubricating the journal pads 32 and thrust pads 38. In this way, the bearing main body 11 can be lubricated and cooled. On the other hand, the remainder of the water fed to the clearance passage 24 is discharged through the discharge hole 31 of the sleeve 23. In this case, the discharge hole 31 of the sleeve 23 communicates with the clearance passage 24 at a position axially apart by a predetermined distance from the feed-water hole 27. Therefore, the water flows in the clearance passage 24 to thereby function as a squeeze film. The damping function (the squeeze film effect) of this squeeze film and the spring function of the O-rings 25 can damp the vibration of the shaft. In particular, the water flows in the clearance passage 24 to thereby prevent a lowering of viscosity due to rising temperature and a lowering of a squeeze film effect due to the mixing of bubbles.

Similarly to the bearing device 12, the sectional area of the exhaust hole 31 of the sleeve 23 is smaller than that of the clearance passage 24. Specifically, it is a minimum value of the passage sectional area of the discharge line adapted to discharge water from the clearance passage 24 through the discharge hole 31 of the sleeve 23. The sectional area of the discharge hole 31 of the sleeve 23 is smaller than a minimum value (the total sectional area of the four lead water holes 29 in the present embodiment) of the passage sectional area of the lead water line 39 adapted to lead water from the clearance passage 24 through the lead water holes 29 and the like of the sleeve 23 to the bearing main body 10. For example, the sectional area of the discharge hole 31 of the sleeve 23 is set at 25% of the total sectional area of the four lead holes 29. Thus, the feed-water pressure of the clearance passage 24 can sufficiently be ensured and the removal ratio of bubbles can be increased, thereby preventing the lowering of the squeeze film effect.

As described above, the bearing devices 12 and 13 of the present invention can provide the effect of damping the vibration of the shaft and lubricate and cool the bearing main bodies 10 and 11, respectively. The clearance passage 24 not only has the squeeze film effect but share the line adapted to supply lubricating water to the bearing main bodies 10, 11. It is not necessary to provide an additional line. Thus, the entire equipment can be downsized. Since the bearing main bodies 10, 11 are of the water lubrication type, the poser loss of the bearing main bodies 10, 11 can be reduced and power generation efficiency can be improved, as compared with the case of e.g. the oil-lubricated type.

In the present embodiment, the feed-water hole 27 of the bearing housing 26 is located at a downside position of the clearance passage 24 and the discharge hole 31 of the sleeve 23 is located at an upside position of the clearance passage 24. Thus, the removal ratio of bubbles mixed in the clearance passage 24 can be increased. Since the discharge hole 31 of the sleeve 23 is located axially externally of the generator 5, it is possible to prevent water from entering the rotor 8 of the generator 5.

The embodiment describes the case where the bearing main bodies 10, 11 are tilting pad bearings by way of example. However, the invention is not limited to this. Specifically, the bearing main bodies 10, 11 may be multilobe bearings or taper land bearings, for example. Such cases can provide the same effects as described above.

As illustrated in FIGS. 3 and 5, the discharge hole 31 of the sleeve 23 is provided axially externally of the generator 5 to prevent water entering the rotor 8 of the generator 5. However, if a labyrinth (not shown) is provided on the side of the rotor 8 of the generator 5 in order to prevent water from seeping, the positional relationship between the discharge hole 31 and feed-water hole 27 of the sleeve 23 may be reversed, that is, the discharge hole 31 may be provided on the axially inside of the generator 5 (close to the rotor 8).

The invention claimed is:

1. A bearing device of gas turbine power generation equipment, comprising:
   a water-lubricated type bearing main body rotatably carrying a rotor of a generator;
   a sleeve provided on the outer circumference side of said bearing main body; and a bearing housing holding said sleeve via an O-ring while forming an annular clearance between the outer circumference of said sleeve and said bearing housing;

wherein said bearing housing has a feed-water hole communicating with the clearance passage and adapted to feed water thereto, said sleeve has a lead water hole communicating with the clearance passage and leading a part of the water, that is fed to the clearance passage from the feed-water hole, to said bearing main body, and a discharge hole which communicates with the clearance passage at a position axially apart by a predetermined distance from a communicating position of the feed-water hole with the clearance passage and discharges a remainder of the water therefrom, and a minimum value of a passage sectional area of a water discharge line adapted to discharge water from the clearance passage through the discharge hole of said sleeve is made smaller than a minimum value of a passage sectional area of a lead water line adapted to lead water from the clearance passage through the lead water hole of said sleeve to said bearing main body.

2. The bearing device of gas turbine power generation equipment according to claim 1, wherein the minimum value of the passage sectional area of the discharge line is made equal to or smaller than 30% of the minimum value of the passage sectional area of the lead water line.

3. The bearing device of gas turbine power generation equipment according to claim 1, wherein the feed-water hole of said bearing housing communicates with the clearance passage at a downside position of the clearance passage and the discharge hole of said sleeve communicates with the clearance passage at an upside position of the clearance passage.

4. The bearing device of gas turbine power generation equipment according to claim 1, wherein the feed-water hole of said bearing housing is located on an inner side with respect to an axial direction of the generator and the discharge hole of said sleeve is located on an outer side with respect to an axial direction of the generator.

5. Gas turbine power generation equipment comprising:
   an impeller of a turbine which converts gas-thermal energy into mechanical energy;
   a generator which has a rotor coaxially connected to said impeller of the turbine and converts the mechanical energy into electrical energy; and
   a bearing device including:
      a water-lubricated type bearing main body rotatably carrying the rotor of said generator;
      a sleeve provided on the outer circumference side of the bearing main body; and
      a bearing housing holding the sleeve via an O-ring while forming an annular clearance between the outer circumference of the sleeve and the bearing housing;
   wherein the bearing housing has a feed-water hole communicating with the clearance passage and adapted to feed water thereto,
   the sleeve has a lead water hole communicating with the clearance passage and adapted to lead water to the bearing main body, and a discharge hole which communicates with the clearance passage at a position axially apart by a predetermined distance from a communicating position of the feed-water hole with the clearance passage and is adapted to discharge water therefrom, and
   a minimum value of a passage sectional area of a water discharge line adapted to discharge water from the clearance passage through the discharge hole of the sleeve is made smaller than a minimum value of a passage sectional area of a lead water line adapted to lead water from the clearance passage through the lead water hole of the sleeve to the bearing main body.

6. The gas turbine power generation equipment according to claim 5, wherein the minimum value of the passage sectional area of the water discharge line is made equal to or smaller than 30% of the minimum value of the passage sectional area of the lead water line.

7. The gas turbine power generation equipment according to claim 5, wherein the feed-water hole of the bearing housing communicates with the clearance passage at a downside position of the clearance passage and the discharge hole of the sleeve communicates with the clearance passage at an upside position of the clearance passage.

8. The gas turbine power generation equipment according to claim 5, wherein the feed-water hole of the bearing housing is located on an inner side with respect to an axial direction of said generator and the discharge hole of the sleeve is located on an outer side with respect to an axial direction of the generator.

* * * * *